Oct. 12, 1926.  1,602,966
F. P. ELLZEY
DUO-CANTILEVER CRADLE SPRING SUSPENSION
Filed Feb. 24, 1925
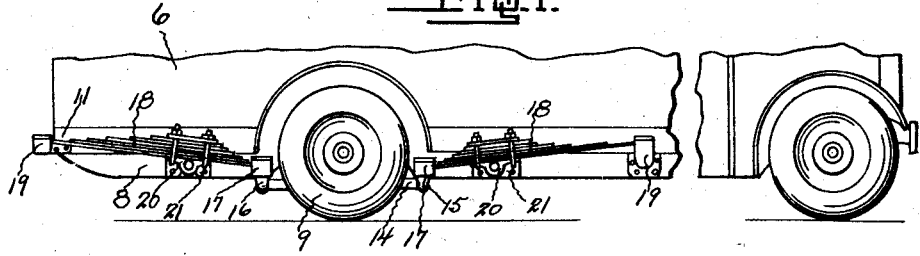
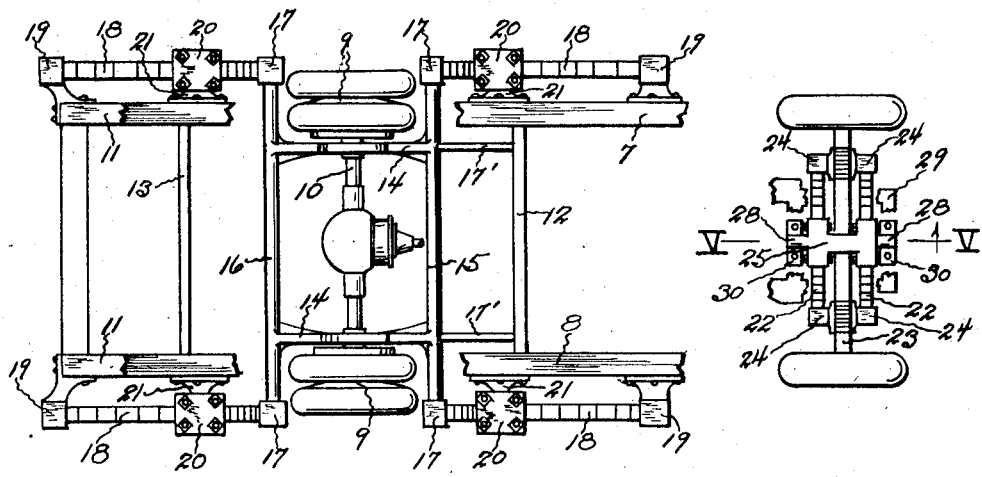
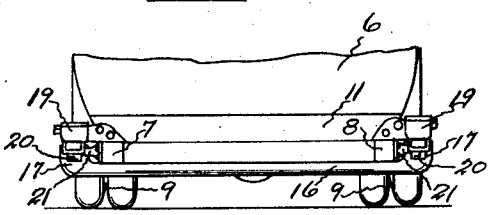
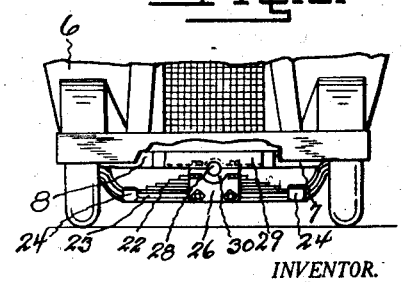
INVENTOR.
Floyd P. Ellzey
BY
ATTORNEY.

Patented Oct. 12, 1926.

1,602,966

UNITED STATES PATENT OFFICE.

FLOYD P. ELLZEY, OF KANSAS CITY, MISSOURI.

DUO CANTILEVER CRADLE SPRING SUSPENSION.

Application filed February 24, 1925. Serial No. 11,049.

This invention relates to vehicles, and particularly to the spring suspension and frame construction of the passenger carrying vehicle known as the motor bus.

It is well known that in the construction of vehicles of this type, it has been the custom to suspend the frame and body by springs always placed at points between the pairs of front and back wheels respectively, with their length extending longitudinally of the frame. Objectionable side sway is prevalent in this construction, and it is the primary object of the present invention to provide a new and novel structure for preventing this side sway, increasing the spring action and making more rigid the frame and that portion of the structure adapted to carry the springs and receive the strain.

Another object of this invention is the provision of a wider frame for such vehicles and the novel way of suspending the same by a series of cantilever springs carried by said frame and supported by the axle through the intermediary of transverse members rigidly attached thereto.

A further object of the present invention is to provide a novel front spring suspension means that will absorb any twisting or torsion strain which might be present.

An even further object of this invention is the contemplation of a new and novel structure for embodying these points of invention. This construction is shown in its preferred form in the accompanying drawing, in which:

Figure 1 is a side elevation of the lower portion of a motor vehicle embodying the invention.

Fig. 2 is a plan view of the same with the body removed and parts of the frame broken away for clearness.

Fig. 3 is a front end view of a motor vehicle having front spring suspension constructed in accordance with this invention.

Fig. 4 is a rear end view of a motor vehicle having spring suspension and rigid transverse members constructed in accordance with this invention.

Fig. 5 is an enlarged vertical central section taken on line V—V of Fig. 2 showing the method of supporting the front end of the vehicle frame.

This invention may be applied to motor cars of any type, and it is desirable to embody it in the same by constructing the frame and suspending means as shown in the drawings, in which similar reference characters refer to like parts throughout the several views.

To prevent side sway of body 6, the side members 7 and 8 are spaced apart substantially as far as the distance between rear wheels 9, which are carried by the well known driven, rear axle 10. Body 6 is constructed with sills 11, adapted to rest upon side members 7 and 8, and tie bars 12 and 13 tend to secure the rigidity of said side members.

One of the desirable features of this vehicle construction is to swing the body 6 thereof as low as possible. To accomplish this, and to further carry out the anti-side sway features of the present invention, axle 10 has rigidly secured thereto a pair of lateral supports 14 extending forwardly and rearwardly therefrom from a position near each wheel 9, and to a point beyond the periphery of wheels 9 where they connect to and support a front and rear transverse member 15 and 16 respectively. Members 15 and 16 are rigidly mounted in a horizontal plane below the horizontal plane of axle 10 and terminate to form shackles 17 beyond the frame side members 7 and 8. It must be understood that these transverse members 15 and 16 are entirely separate from any part of the frame, except, perhaps, a pair of radius rods 17', the same being connected through a series of four springs 18 carried by the side members 7 and 8 of the frame. Instead of springs 8, any resilient means such as hydraulic or air springs or cushions may be used. It is preferred, however, to use a leaf spring 18 such as that shown in the drawing. Springs 18 should have their ends nearest wheels 9 in engagement with shackles 17, and should extend rearwardly and forwardly from said rear wheels 9, as shown in Fig. 2, parallel with the side members of the frame to shackles 19, rigidly attached to frame members 7 and 8, or, as in the case of the rear shackles, to sill 11 of body 6. The ends of springs 18 farthest from wheels 9 are somewhat higher than the ends adjacent said wheels, and a bracket 20 secured to the spring 18 intermediate the ends thereof, pivotally engages co-acting bracket 21 which is rigidly supported by frame members 7 and 8. Cantilever springs are thus provided which give the maximum resiliency. It should be noticed that the points of body suspension are widely separated and not confined between rear wheels 9. It is obvious that side sway is materially eliminated.

To accommodate such twisting as is present, the invention contemplates the use of a pair of springs 22 carried in front and in back of front axle 23 by shackles 24, secured to axle 23 as shown in Figs. 2, 3 and 5. A bracket 25 having downwardly projecting plates 26 for engaging springs 22 at their center is also provided with forwardly and rearwardly extending pintles 28 which are pivotally secured, to the narrowed portion 29 of the frame, by caps 30. The function of this front spring suspension is evident, and its co-action with the novel rear spring suspension presents the most desirable results.

It is desired to be limited in the construction of this invention only by the scope of the appended claims.

What is claimed is:

1. In combination with a vehicle frame, rear axle and wheels, transverse members supported by said axle in a horizontal plane below the horizontal plane of said axle and with their ends terminating beyond the outermost sides of said frame and a spring carried by said frame adjacent each end of said transverse members, one end of each spring engaging the adjacent end of one of said transverse members, said springs all disposed in substantially the same vertical plane as the outermost sides of the wheels.

2. In combination with a vehicle frame, rear axle and wheels, transverse members rigidly supported by said axle, said members being parallel to said axle, disposed to the front and rear respectively thereof and terminating beyond the sides of said frame, a spring adjacent each end of said transverse members having one of its ends in engagement therewith and means for attaching each spring to said vehicle frame.

3. In combination with a vehicle frame, rear axle and wheels, a pair of transverse members rigidly supported by said axle, said members being parallel thereto and disposed to the front and rear thereof, a spring engaging each of the ends of said transverse members, each of said springs being pivotally mounted intermediate its ends to said frame.

4. In combination with a vehicle frame, rear axle and wheels, a pair of transverse members rigidly supported by said axle, said members being parallel to and disposed in a horizontal plane below the axle, said transverse members being independent of and terminating beyond the sides of said frame, springs having one of their ends respectively engaging each of the ends of said members, the other end of each spring being carried by a shackle rigidly attached to said frame and a bracket carried by each of said springs intermediate its ends, said bracket being pivotally mounted on said frame.

5. In a vehicle of the class described having a rear axle and wheels, a body supporting frame having a width equal to the distance between said wheels, a front and a rear transverse member rigidly supported by said axle and terminating beyond the sides of said frame, a pair of front springs carried by said frame having their rearward ends attached to the respective ends of said front transverse member and a pair of back springs also carried by said frame and having their forward ends attached to the respective ends of said rear transverse member.

6. In a vehicle of the class described having a rear axle and wheels, a body supporting frame having a width equal to the distance between said wheels, a pair of transverse members rigidly supported by said frame and axle independently of the frame and terminating beyond the side members thereof and cantilever springs carried by said frame side members extending in opposite directions from said wheels, said transverse members being disposed in front and behind said wheels and extending beyond the same each to engage one end of the adjacent spring.

In testimony whereof I hereunto affix my signature this 19th day of February, 1925.

FLOYD P. ELLZEY.